(12) United States Patent
Ikehara et al.

(10) Patent No.: US 11,118,708 B2
(45) Date of Patent: Sep. 14, 2021

(54) HIGH PRESSURE HOSE

(71) Applicant: BRIDGESTONE CORPORATION, Tokyo (JP)

(72) Inventors: Kiyoshi Ikehara, Tokyo (JP); Teppei Shibata, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 91 days.

(21) Appl. No.: 16/564,052

(22) Filed: Sep. 9, 2019

(65) Prior Publication Data
US 2020/0003342 A1 Jan. 2, 2020

Related U.S. Application Data

(63) Continuation of application No. PCT/JP2018/008432, filed on Mar. 5, 2018.

(30) Foreign Application Priority Data

Mar. 10, 2017 (JP) .............................. JP2017-046759

(51) Int. Cl.
*F16L 11/10* (2006.01)

(52) U.S. Cl.
CPC ..................... *F16L 11/10* (2013.01)

(58) Field of Classification Search
CPC ........ F16L 11/08; F16L 11/081; F16L 11/082; F16L 11/083; F16L 11/10; F16L 1/25
(Continued)

(56) References Cited

U.S. PATENT DOCUMENTS

| 4,992,314 A * | 2/1991 | Saitoh ................... C08K 5/378 |
| | | 428/36.3 |
| 5,244,016 A | 9/1993 | Kuroda et al. |

(Continued)

FOREIGN PATENT DOCUMENTS

| CN | 102143834 A | 8/2011 |
| CN | 203421355 U | 2/2014 |

(Continued)

OTHER PUBLICATIONS

Communication dated Dec. 3, 2020 by the European Patent Office in application No. 18763715.2.

(Continued)

*Primary Examiner* — Patrick F Brinson
(74) *Attorney, Agent, or Firm* — Sughrue Mion, PLLC

(57) ABSTRACT

A high pressure hose with a reinforcing steel cord having twisted steel filaments. A first condition is a condition in which a winding direction of a steel cord in an $N^{th}$ ($N \geq 1$) steel cord reinforced layer and in an $(N+1)^{th}$ steel cord reinforced layer are different, and a winding direction of a steel cord in a first steel cord reinforced layer (11a) and a twisting direction of an outermost layer steel filament in the steel cord in the first steel cord reinforced layer (11a) are different. A second condition is a condition in which the twisting direction of the outermost layer steel filament in the steel cord in the first steel cord reinforced layer (11a) and of an outermost layer steel filament in a steel cord in a second steel cord reinforced layer (11b) are identical. The first condition and second condition are not simultaneously satisfied.

4 Claims, 1 Drawing Sheet

(58) Field of Classification Search
USPC ...... 138/129, 130–134, 138; 428/36.91, 36.9
See application file for complete search history.

(56) References Cited

U.S. PATENT DOCUMENTS

| | | | | |
|---|---|---|---|---|
| 5,316,046 | A * | 5/1994 | Igarashi | F16L 11/086 138/125 |
| 6,109,306 | A * | 8/2000 | Kleinert | F16L 11/083 138/127 |
| 6,677,018 | B1 * | 1/2004 | Satoh | B32B 25/042 428/36.9 |
| 7,694,695 | B2 * | 4/2010 | Johnson | F16L 11/082 138/123 |
| 7,950,420 | B2 * | 5/2011 | Amma | B32B 5/026 138/125 |
| 10,502,344 | B2 * | 12/2019 | Suzuki | B32B 1/08 |
| 2005/0241716 | A1 | 11/2005 | Nagy et al. | |
| 2010/0266789 | A1 | 10/2010 | Conley et al. | |
| 2011/0214773 | A1 | 9/2011 | Hamachi et al. | |

FOREIGN PATENT DOCUMENTS

| | | | |
|---|---|---|---|
| JP | 05-272678 | A | 10/1993 |
| JP | 11-315969 | A | 11/1999 |
| JP | 2007-162818 | A | 6/2007 |
| JP | 2012-036927 | A | 2/2012 |

OTHER PUBLICATIONS

Search Report dated Jul. 21, 2020 issued by the China National Intellectual Property Administration in application No. 201880017260.6.

International Search Report of PCT/JP2018/008432 dated Apr. 24, 2018.

* cited by examiner

AXIAL DIRECTION OF HOSE

HIGH PRESSURE HOSE

CROSS-REFERENCE TO RELATED APPLICATIONS

This application is a Continuation of International Application No. PCT/JP2018/008432 filed Mar. 5, 2018, claiming priority based on Japanese Patent Application No. 2017-046759 filed Mar. 10, 2017, the contents of all of which are incorporated herein by reference in their entirety.

TECHNICAL FIELD

The present invention relates to high pressure hoses, and specifically relates to a high pressure hose excellent in shock durability.

BACKGROUND ART

A high pressure hose with flexibility used for a construction machine, a working machine, a power steering hose of an automobile, a measuring instrument and the like is generally provided with an inner rubber layer and a plurality of reinforcing layers disposed on the outer periphery thereof. As a reinforcing material for a high pressure hose including such reinforced layers, fibers such as steel filaments, nylon, polyester, or the like are commonly used and, for example, in the case of a high pressure hose having a four-layer structure, winding is performed so that right-hand winding (hereinafter, also referred to as "Z-wound") and left-hand winding (hereinafter, also referred to as "S-wound") are alternated.

As a technology related to the improvement of such a high pressure hose, for example, Patent Document 1 proposes that the directions of winding steel filaments as reinforcing materials are disposed so that the directions of winding the inner and outer reinforcing materials are symmetrical with an intermediate layer interposed therebetween. Such a configuration enables the interlayer shear strain of the interior of a high pressure hose to be canceled in a case in which the high pressure hose is subject to bending deformation, thereby decreasing the strain of entire layers to improve durability against cyclic bending deformation.

RELATED ART DOCUMENT

Patent Document

Patent Document 1: JPH11-315969A

SUMMARY OF THE INVENTION

Problems to be Solved by the Invention

In such a case, the flexural rigidity of the steel filaments is proportional to the fourth power of a diameter, and therefore, a steel cord in which thinner steel filaments are twisted is more flexible in comparison at the same cross-sectional area. The thicker the steel filaments of 0.4 mm or more are, the less easily the strength per cross-sectional area is obtained, and therefore, twisting of steel filaments of 0.4 mm or less in diameter facilitates the obtainment of the strength to enable weight reduction. Thus, a steel cord in which thin steel filaments are twisted is used when a product requiring performance of flexibility and high strength, such as a tire, is reinforced with steel.

Conventionally, the achievement of both strength and flexibility, equivalent to those of a tire, has not been demanded in reinforcement of a high pressure hose, and therefore, a steel cord with the man-hour of twisting steel filaments has not commonly been used. For further imparting high strength and flexibility to a high pressure hose used at even higher pressure, however, a single steel filament has a limitation, and such a steel cord, in which steel filaments are twisted, as being used for reinforcing a tire, can also be considered to be applied to the high pressure hose. However, a new problem has occurred that a high pressure hose using a steel cord, in which steel filaments are twisted, as a reinforcing material may result in insufficient improvement in shock durability.

Thus, an object of the present invention is to provide a high pressure hose that is excellent in shock durability while using, as a reinforcing material, a steel cord in which steel filaments are twisted.

Means for Solving the Problems

As a result of intensive examination for solving the problems described above, the present inventors obtained the following findings. In other words, as a result of observing the fracture morphology of a high pressure hose in detail, it was found that dents considered to be caused by contact with steel filaments in another reinforced layer were scattered on the surfaces of steel filaments included in a steel cord as a reinforcing material, and the steel filaments were ruptured starting from the vicinities of the dents. As a result of further intensive examination based on such findings, the present inventors found that the problems described above can be solved by allowing the direction of winding a steel cord in a reinforced layer and the direction of twisting steel filaments to satisfy a predetermined relationship, and the present invention was thus accomplished.

In other words, a high pressure hose of the present invention includes a structure formed by layering a plurality of steel cord reinforced layers formed by spirally winding a steel cord formed by twisting a plurality of steel filaments,
wherein assuming that
a first condition is a condition in which
a direction of winding a steel cord in an $N^{th}$ (N≥1) steel cord reinforced layer and a direction of winding a steel cord in an $(N+1)^{th}$ steel cord reinforced layer are different from each other, and
a direction of winding a steel cord in a first steel cord reinforced layer and a direction of twisting an outermost layer steel filament in the steel cord in the first steel cord reinforced layer are different, and
a second condition is a condition in which the direction of twisting the outermost layer steel filament in the steel cord in the first steel cord reinforced layer and a direction of twisting an outermost layer steel filament in a steel cord in a second steel cord reinforced layer are identical,
the first condition and the second condition are not simultaneously satisfied.

In the high pressure hose of the present invention, assuming that
a third condition is a condition in which a direction of winding a steel cord in an $L^{th}$ (L≥2) steel cord reinforced layer and a direction of twisting an outermost layer steel filament in the steel cord in the $L^{th}$ steel cord reinforced layer are different, and
a fourth condition is a condition in which the direction of twisting the outermost layer steel filament in the steel cord in the $L^{th}$ steel cord reinforced layer and a direction of twisting an outermost layer steel filament in a steel cord in an $(L+1)^{th}$ steel cord reinforced layer are identical, it is preferable that the third condition and the fourth condition are not simultaneously satisfied.

In addition, it is preferable that a fifth condition is satisfied in which the direction of twisting the outermost layer steel filament in the steel cord in the first steel cord reinforced layer and the direction of twisting the outermost layer steel filament in the steel cord in the second steel cord reinforced layer are identical.

Further, in addition, assuming that the third condition is a condition in which the direction of winding the steel cord in the $L^{th}$ ($L≥2$) steel cord reinforced layer and the direction of twisting the outermost layer steel filament in the steel cord in the $L^{th}$ steel cord reinforced layer are different, the fourth condition is a condition in which the direction of twisting the outermost layer steel filament in the steel cord in the $L^{th}$ steel cord reinforced layer and the direction of twisting the outermost layer steel filament in the steel cord in the $(L+1)^{th}$ steel cord reinforced layer are identical, a third' condition is a condition in which a direction of winding a steel cord in an $M^{th}$ ($M≥1$, and L and M are different) steel cord reinforced layer and a direction of twisting an outermost layer steel filament in the steel cord in the $M^{th}$ steel cord reinforced layer are different, a fourth' condition is a condition in which the direction of twisting the outermost layer steel filament in the steel cord in the $M^{th}$ steel cord reinforced layer and a direction of twisting an outermost layer steel filament in a steel cord in an $(M+1)^{th}$ steel cord reinforced layer are identical, G1 is a gap between the steel cord in the $L^{th}$ steel cord reinforced layer and the steel cord in the $(L+1)^{th}$ steel cord reinforced layer in a case in which the third condition and the fourth condition are simultaneously satisfied, and G2 is a gap between the steel cord in the $M^{th}$ steel cord reinforced layer and the steel cord in the $(M+1)^{th}$ steel cord reinforced layer in a case in which the third' condition and the fourth' condition are not simultaneously satisfied, it is also preferable that G1>G2 is satisfied.

Herein, in a high pressure hose 10 of the present invention, steel cord reinforced layers 11 and intermediate rubber layers 12 are counted from the inner side in the hose radial direction. In addition, with regard to the outermost layer steel filament, for example, each steel filament included in a steel cord forms an outermost layer in a case in which the steel cord is a single twisted steel cord having a (1×n) structure, and a steel filament in an outermost layer sheath forms an outermost layer in the case of a layer twisted steel cord. Further, in the high pressure hose 10 of the present invention, N, L, and M representing the numbers of reinforced layers, and n representing the twisting structure of a steel cord are optional integers.

Effects of the Invention

In accordance with the present invention, there can be provided a high pressure hose that is excellent in shock durability while using, as a reinforcing material, a steel cord in which steel filaments are twisted.

MODE FOR CARRYING OUT THE INVENTION

A high pressure hose of the present invention will be described in detail below with reference to the drawings.

Figure 1:
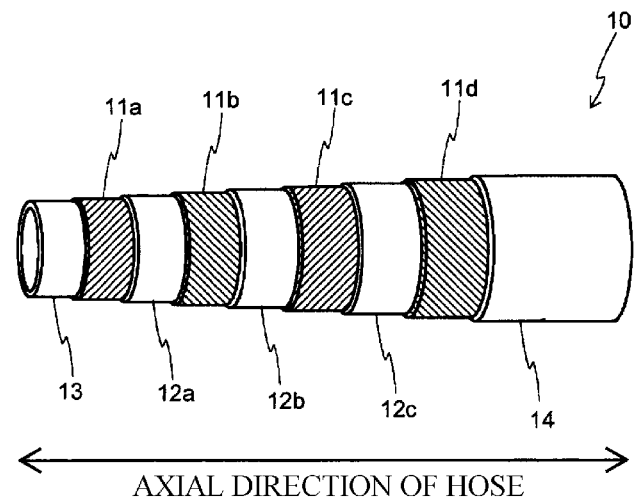
FIG. 1 is a cross-sectional perspective view of a high pressure hose according to a preferred embodiment of the present invention.

FIG. 1 is a cross-sectional perspective view of a high pressure hose according to a preferred embodiment of the present invention. A high pressure hose 10 of the present invention is a high pressure hose having a structure formed by layering plural steel cord reinforced layers (hereinafter, also simply referred to as "reinforced layer") 11 formed by spirally winding a steel cord formed by twisting plural steel filaments. In the high pressure hose of the present invention, the steel cord reinforced layers 11 may be layered via intermediate rubber layers 12 as illustrated in the drawing, and only the steel cord reinforced layers 11 may be consecutively layered. In addition to the structure in which the plural steel cord reinforced layers 11 are layered, for example, a reinforced layer using a code other than a steel cord, such as an organic fiber code, may be included. For example, an organic fiber reinforced layer with vinylon, nylon, polyethylene terephthalate (PET), or the like may be included more inwardly in the hose radial direction than the steel cord reinforced layers. In the high pressure hose illustrated in the drawing, an inner rubber layer 13 having a tubular shape is formed in an innermost layer, an outer rubber layer 14 having a tubular shape is formed in an outermost layer, and the four steel cord reinforced layers 11 and the three intermediate rubber layers 12 may be alternately arranged between the inner rubber layer 13 and the outer rubber layer 14.

In the high pressure hose 10 of the present invention, a direction of winding a steel cord in an $N^{th}$ reinforced layer 11 and a direction of winding a steel cord in an $(N+1)^{th}$ reinforced layer 11 are different from each other. Although the four layers of which the first layer is S-wound, the second layer is Z-wound, the third layer is S-wound, and the fourth layer is Z-wound from the inner side are configured in the example illustrated in the drawing, four layers of which the first layer is Z-wound, the second layer is S-wound, the third layer is Z-wound, and the fourth layer is S-wound may be configured. In the high pressure hose 10 of the present invention, the number of reinforced layers 11 is not particularly limited, but may be five or more, and can be changed depending on a purpose of use, as appropriate. Ten or less layers are preferred, and eight or less layers are more preferred.

Figure 2:
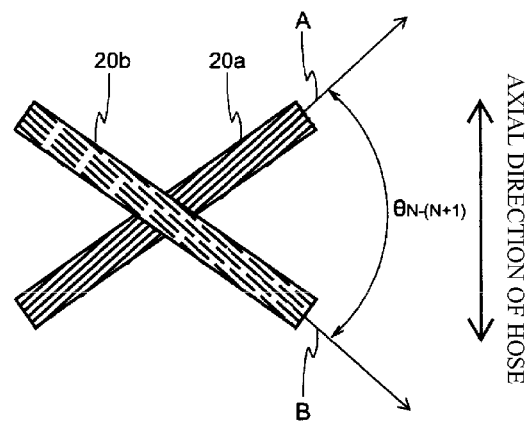
FIG. 2 is an explanatory diagram illustrating an example of a relationship between directions of winding and twisting a steel cord in an $N^{th}$ layer and a steel cord in an $(N+1)^{th}$ layer.
Figure 3:
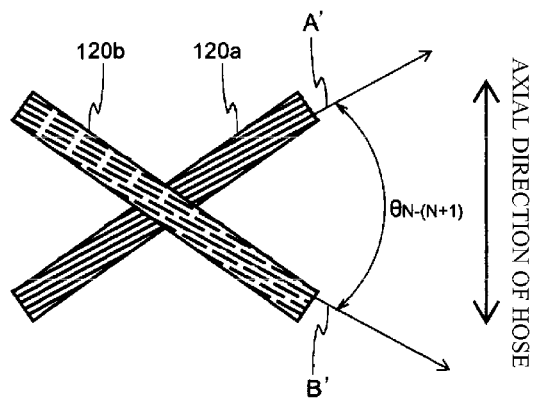
FIG. 3 is an explanatory diagram illustrating another example of a relationship between directions of winding and twisting a steel cord in the $N^{th}$ layer and a steel cord in the $(N+1)^{th}$ layer.

Next, FIG. 2 illustrates an explanatory diagram illustrating an example of a relationship between directions of winding and twisting a steel cord in the $N^{th}$ layer and a steel cord in the $(N+1)^{th}$ layer, and FIG. 3 illustrates an explanatory diagram illustrating another example of a relationship between directions of winding and twisting a steel cord in the $N^{th}$ layer and a steel cord in the $(N+1)^{th}$ layer. In FIG. 2, a steel cord 20a is Z-wound and S-twisted, and a steel cord 20b is S-wound and S-twisted, while, in FIG. 3, a steel cord 120a is Z-wound and Z-twisted, and a steel cord 120b is S-wound and Z-twisted. In addition, arrows A, A', B, and B' in the drawings indicate the directions of twisting steel filaments included in the respective steel cords. Herein, positions at which the steel filaments come into contact with each other are in the hose radial direction outer sides of the steel cords 20a, 120a in the $N^{th}$ layer, and in the hose radial direction inner sides of the steel cords 20b, 120b in the $(N+1)^{th}$ layer. Thus, in FIGS. 2 and 3, the directions of twisting the steel filaments in the hose radial direction inner sides of the steel cords 20b, 120b in the $(N+1)^{th}$ layer are indicated by dashed lines.

When the high pressure hose including the reinforced layers 11 formed by spirally winding the steel cords is pressurized, larger stress is applied to a steel cord in a layer located on an inner side. The intermediate rubber layers 12 are commonly disposed between the layered reinforced layers 11, and repeatedly applied pressure causes the intermediate rubber layers 12 to be fatigued, and then allows the steel cords in the layered reinforced layers 11 to come into contact with each other. Such contact points become the maximum portions of the repeated stress, fatigue rupture occurs starting from the vicinities thereof, and the high pressure hose 10 then becomes incapable of maintaining the pressure and becomes dead. In such a case, when the cross angle $\theta_{N-(N+1)}$ between the steel filaments included in the steel cords approaches 90°, i.e., when the steel cords becomes nearly perpendicular to each other as illustrated in FIG. 2, the stress concentrates on the narrow region (point contacts) in the contacts between the steel cords, and therefore, fatigue durability is deteriorated. In contrast, when the cross angle $\theta_{N-(N+1)}$ approaches 0°, i.e., the steel cords become nearly parallel to each other as illustrated in FIG. 3, the stress is dispersed (line contacts), and fatigue durability becomes favorable.

Accordingly, in the first reinforced layer 11a, to which the largest stress is applied, and the second reinforced layer 11b, the fatigue durability of the high pressure hose 10 can be improved by decreasing the cross angle $\theta_{1-2}$ between the steel filaments in the hose radial direction outer side of the steel cord in the first layer and the steel filaments in the hose radial direction inner side of the steel cord in the second layer. In other words, in the first reinforced layer 11a and the second reinforced layer 11b, the durability of the high pressure hose 10 can be improved by removing a condition in which the cross angle $\theta_{1-2}$ between the steel filaments is increased. Specifically, it is necessary that the following first and second conditions are not simultaneously satisfied.

In the first condition, a direction of winding a steel cord in the first reinforced layer 11a and a direction of twisting outermost layer steel filaments in the steel cord in the first reinforced layer 11a are different. In addition, in the second condition, a direction of twisting the outermost layer steel filaments in the steel cord in the first reinforced layer 11a and a direction of twisting outermost layer steel filaments in a steel cord in the second reinforced layer 11b are identical.

In other words, a case in which the first condition and the second condition are not simultaneously satisfied is a case in which the direction of winding the steel cord in the first reinforced layer 11a and the direction of twisting the outermost layer steel filaments in the steel cord in the first reinforced layer 11a are identical, or a case in which the direction of winding the steel cord in the first reinforced layer 11a and the direction of twisting the outermost layer steel filaments in the steel cord in the first reinforced layer 11a are different, but the direction of twisting the outermost layer steel filaments in the steel cord in the first reinforced layer 11a and the direction of twisting the outermost layer steel filaments in the steel cord in the second reinforced layer 11b are different.

In FIG. 2, the steel cord 20a in the first layer is Z-wound and S-twisted, the steel cord 20b in the second layer is S-wound and S-twisted, and the first condition and the second condition are simultaneously satisfied. When the first condition and the second condition are simultaneously satisfied, a cross angle $\theta_{1-2}$ between steel filaments in the hose radial direction outer side of the steel cord 20a in the first layer and steel filaments in the hose radial direction inner side of the steel cord 20b in the second layer is maximized, and in the example illustrated in the drawing, the steel filaments generally perpendicularly cross each other. Accordingly, the fatigue durability of the high pressure hose can be improved by removing a combination in which the first condition and the second condition are simultaneously satisfied, in the first reinforced layer 11a and the second reinforced layer 11b.

A more specific explanation will be given by taking FIG. 2 as an example. With regard to the directions of winding the steel cords in the reinforced layers 11 of the high pressure hose 10, the first layer is Z-wound, the second layer is S-wound, the third layer is Z-wound, and the fourth layer is S-wound from the inner side, the angles of winding the steel cords in all the reinforced layers 11 are set at 54.7° with respect to the axis of the hose, all the steel cords are S-twisted, and the angles of twisting all the steel filaments with respect to the axes of the codes are set at 6.9°.

Herein, the steel cord in the first layer is Z-wound, and therefore wound in a direction of 54.7° to the right with respect to the axis of the hose, the twisting angle of the S-twisted steel filaments in the outer side coming in contact with the second layer is 6.9° to the left with respect to the axis of the steel cord, and therefore, the direction of twisting the steel filaments is at 54.7°−6.9°=47.8° to the right with respect to the axis of the hose. In contrast, with regard to the second layer, the steel cord is S-wound, and therefore wound in a direction of 54.7° to the left with respect to the axis of the hose, and the steel filaments in the inner side coming in contact with the first layer are at 6.9° to the right with respect to the axis of the steel cord and at 54.7−6.9=47.8° to the left with respect to the axis of the hose in the case of being S-twisted. As a result, the steel filaments in the first reinforced layer 11a and the steel filaments in the second reinforced layer 11b cross each other at a nearly perpendicular angle of 47.8+47.8=95.6°, i.e., 84.4°. In similar consideration, a cross angle $\theta_{2-3}$ between the steel filaments in the second and third layers is 56.8°, and a cross angle $\theta_{3-4}$ between the steel filaments in the third and fourth layers is 84.4°. Such a high pressure hose in which the cross angle $\theta_{1-2}$ between the reinforced layer 11a and the reinforced layer 11b is a nearly perpendicular angle is unfavorable in shock durability.

In the high pressure hose 10 of the present invention, the less cross angle $\theta_{1-2}$ between the steel filaments in the hose radial direction outer side of the steel cord in the first reinforced layer 11a and the steel filaments in the hose radial direction inner side of the steel cord in the second reinforced layer 11b is preferable, and the cross angle is preferably 72° or less. The cross angle $\theta_{N-(N+1)}$ can be adjusted by designing the angle of winding the steel cord and the twisting pitch of the steel filaments, as appropriate.

In the high pressure hose 10 of the present invention, not only the relationship between the first reinforced layer 11a and the second reinforced layer 11b but also a relationship between an $L^{th}$ reinforced layer 11 of the second or later layer and an $(L+1)^{th}$ reinforced layer 11 is preferably a similar relationship. In other words, it is preferable to remove a condition in which a cross angle $\theta_{L-(L+1)}$ between steel filaments is maximized from the entire high pressure hose. Such a structure enables the fatigue durability of the high pressure hose 10 to be further improved. Specifically, it is necessary that the following third and fourth conditions are not simultaneously satisfied.

In the third condition, the direction of winding a steel cord in the $L^{th}$ reinforced layer 11 of the second or later layer and the direction of twisting outermost layer steel filaments in the steel cord in the same reinforced layer are different. In the fourth condition, the direction of twisting the outermost layer steel filaments in the steel cord in the $L^{th}$ reinforced layer 11 and the direction of twisting outermost layer steel filaments in a steel cord in the $(L+1)^{th}$ reinforced layer 11 are identical. In other words, a case in which the third condition and the fourth condition are not simultaneously satisfied is a case in which the direction of winding the steel cord in the $L^{th}$ reinforced layer 11 of the second or later layer and the direction of twisting the outermost layer steel filaments in the steel cord in the $L^{th}$ reinforced layer 11 are identical, or a case in which the direction of winding the steel cord in the $L^{th}$ reinforced layer 11 and the direction of twisting the outermost layer steel filaments in the steel cord in the $L^{th}$ reinforced layer 11 are different while the direction of twisting the outermost layer steel filaments in the steel cord in the $L^{th}$ reinforced layer 11 and the direction of twisting the outermost layer steel filaments in the steel cord in the $(L+1)^{th}$ reinforced layer 11 are different.

In the high pressure hose 10 of the present invention, it is preferable to satisfy the fifth condition in which the direction of twisting the outermost layer steel filaments in the steel cord in the first reinforced layer 11a and the direction of twisting the outermost layer steel filaments in the steel cord in the second reinforced layer 12a are identical. In FIG. 3, the steel cord in the $N^{th}$ layer is Z-wound and Z-twisted, the steel cord in the $(N+1)^{th}$ layer is S-wound and Z-twisted, and the relationship between the steel cords corresponds to a case in which the fifth condition is satisfied where N=1. In such a case in which the fifth condition is satisfied as described above, the cross angle $\theta_{N\text{-}(N+1)}$ between the steel filaments in the hose radial direction outer side of the steel cord in the $N^{th}$ layer and the steel filaments in the hose radial direction inner side of the steel cord in the $(N+1)^{th}$ layer is the smallest. In other words, the steel cords have the most preferred relationship from the viewpoint of shock durability. Accordingly, the fatigue durability of the high pressure hose 10 can be further improved by allowing the fifth condition to be satisfied.

In the high pressure hose 10 of the present invention, the fatigue durability can be further improved by widening a gap between the steel cords between the reinforced layers 11. However, a simple widening of the gap between the steel cords between the reinforced layers 11 is unfavorable because of resulting in the larger diameter of the high pressure hose 10. Accordingly, in the high pressure hose 10 of the present invention, an increase in a gap between steel cords at only a spot at which the cross angle $\theta_{L\text{-}(L+1)}$ between the steel cord in the $L^{th}$ reinforced layer of the second or later layer and the steel cord in the $(L+1)^{th}$ layer is greater, i.e., at only a spot at which the third condition and the fourth condition are simultaneously satisfied prevents the diameter of the high pressure hose from being increased, and enables shock durability to be improved while improving reinforcement efficiency.

Specifically, it is assumed that G1 is a gap between the steel cord in the $L^{th}$ steel cord reinforced layer and the steel cord in the $(L+1)^{th}$ steel cord reinforced layer in a case in which the third condition and the fourth condition are simultaneously satisfied. In addition, G1>G2 is preferred when it is newly assumed that a third' condition is a condition in which a direction of winding a steel cord in an $M^{th}$ (M≥1, and L and M are different) steel cord reinforced layer 11 and a direction of twisting outermost layer steel filaments in the steel cord in the $M^{th}$ steel cord reinforced layer are different, a fourth' condition is a condition in which the direction of twisting the outermost layer steel filaments in the steel cord in the $M^{th}$ steel cord reinforced layer 11 and a direction of twisting outermost layer steel filaments in a steel cord in the $(M+1)^{th}$ steel cord reinforced layer are identical, and G2 is a gap between the steel cord in the $M^{th}$ steel cord reinforced layer and the steel cord in the $(M+1)^{th}$ steel cord reinforced layer in a case in which the third' condition and the fourth' condition are not simultaneously satisfied. G1>G2×1.5 is more preferred, and G1>G2×3 is still more preferred. In addition, G1 is preferably 0.1 to 1.0 mm, and more preferably 0.2 to 0.6 mm, from the viewpoint of the durability of the high pressure hose. In addition, G2 is preferably 0.04 to 0.6 mm, and more preferably 0.1 to 0.4 mm. Means for widening a gap between steel cords is not particularly limited, and, for example, an intermediate rubber layer 12 may be disposed between a reinforced layer 11 and a reinforced layer 11, as illustrated in FIG. 1.

In the high pressure hose 10 of the present invention, it is important that the directions of winding the steel cords and the direction of twisting the steel filaments in the reinforced layers 11 satisfy a predetermined relationship, and other specific structures, materials, and the like are not particularly limited.

For example, such a steel cord used in the reinforced layers 11 may have a single-twisted or layer-twisted structure. In addition, a known steel filament can be used as such a steel filament included in the steel cords, the filament diameter of the steel filament is preferably 0.12 to 0.40 mm, and the twisting angle of the steel filament is preferably 2.6 to 15°, more preferably 3 to 8°, and still more preferably 3.5 to 7°. Further, the angle of winding such a steel cord in the reinforced layers 11 is preferably 50 to 60°. A filament diameter of less than 0.12 mm results in the deterioration of steel filament drawing productivity, while a filament diameter of more than 0.40 mm precludes the obtainment of a cost per cross-sectional area and results in the increase of flexural rigidity proportional to the fourth power of a diameter. A twisting angle of less than 2.6° is prone to cause the steel filaments to be unwound, thereby inhibiting productivity, while a twisting angle of more than 15° results in the deterioration of the productivity of twisting. In addition, a steel cord winding angle of less than 50° results in an increased change in the diameter of the hose when pressure is applied to the hose, while a steel cord winding angle of more than 60° results in an increased change in the length of the hose when pressure is applied to the hose. When the steel filaments are twisted, a bend having a helical shape, a polygonal shape, a wave shape, or the like may be created in all or some of the steel filaments included in the code. Examples of the creation of a bend having a polygonal shape can include such creation of a bend as described in International Publication No. WO1995/016816A.

In addition, rubber used in the high pressure hose 10 is not particularly limited either, and the material of the inner rubber layer 13 can be selected based on the physical and chemical properties, and the like of a substance transported into the high pressure hose 10, as appropriate. Specific examples thereof include ethylene-propylene copolymer rubber (EPM), ethylene-propylene-diene ternary copolymer rubber (EPDM), acrylic rubber (ACM), ethylene acrylate rubber (AEM), chloroprene rubber (CR), chlorosulfonated polyethylene rubber, hydrin rubber, styrene-butadiene copolymer rubber (SBR), acrylonitrile-butadiene copolymer rubber (NBR), isobutylene-isoprene copolymer rubber (butyl rubber, IIR), natural rubber (NR), isoprene rubber (IR), butadiene rubber (BR), urethane-based rubber, silicone-based rubber, fluorine-based rubber, ethylene-vinyl acetate copolymer (EVA), and hydrogenated NBR. These rubber components may be used singly or in an optional blend of two or more.

Among the rubber components described above, acrylic rubber (ACM), ethylene acrylate rubber (AEM), chloroprene rubber (CR), chlorosulfonated polyethylene rubber, hydrin rubber, acrylonitrile-butadiene copolymer rubber (NBR), hydrogenated NBR, silicone-based rubber, and fluorine-based rubber are preferred from the viewpoint of oil resistance.

In addition, a known rubber compounding agent or a filler for rubber, commonly used in the rubber industry, can be used in a rubber composition for the inner rubber layer 13 in consideration of material strength, durability, extrusion formability, and the like. Examples of such compounding agents and fillers include: inorganic fillers such as carbon black, silica, calcium carbonate, talc, and clay; plasticizers, softening agents; vulcanizing agents such as sulfur and peroxide; vulcanization aids such as zinc oxide and stearic acid; vulcanization accelerators such as dibenzothiazyl disulfide, N-cyclohexyl-2-benzothiazyl-sulfenamide, and N-oxydiethylene-benzothiazyl-sulfenamide; and additives such as antioxidants and antiozonants. These compounding agents and fillers may be used singly or in combination of two or more.

The thickness of the inner rubber layer 13 also varies according to the kind of a material included in the inner rubber layer 13, but is in a range of 1 to 10 mm, and preferably in a range of 1 to 6 mm. In addition, the inner diameter of the high pressure hose is selected depending on a purpose, and is commonly preferably in a range of 3 mm to 200 mm.

In addition, the outer rubber layer 14 may include, for example, a thermoplastic resin or the like similarly in the case of conventional high pressure hoses, and may include various rubbers similar to those of the inner rubber layer 13. The disposition of the outer rubber layer 14 enables the steel cords included in the reinforced layers 11 to be protected to prevent the reinforced layers 11 from being damaged, and also allows appearance to be preferred. The wall thickness of the outer rubber layer 14 is commonly in a range of 1 mm to 20 mm.

Further, the intermediate rubber layers 12 can be formed of various rubbers similar to those of the inner rubber layer 13.

The high pressure hose of the present invention can be manufactured according to a usual method, and is particularly useful as a high pressure hose used for transporting various high pressure fluids, or as a high pressure hose used for pressure-feeding hydraulic oil for an oil pressure pump to an actuating part.

EXAMPLES

The present invention will be described in more detail below with reference to Examples.

Examples 1 to 5 and Comparative Examples 1 to 4

Steel filaments having a filament diameter of 0.3 mm are twisted at a pitch of 9 mm to produce a steel cord having a (1×3) structure. The twisting angle of the steel filaments with respect to the axis of the steel cord is 6.9°. The obtained steel cord is used as a reinforcing material for a reinforced layer, to produce a high pressure hose having a structure illustrated in FIG. 1. With regard to the direction of winding the steel cord, the first layer is Z-wound, the second layer is S-wound, the third layer is Z-wound, and the fourth layer is S-wound, and a winding angle is set at 54.7°. In addition, the directions of twisting the steel filaments in the respective layers and the gaps between the steel cords in the respective reinforced layers are set forth in Tables 1 and 2 below.

<Shock Durability>

A shock pressure test in conformity with JIS K 6330-8 is conducted, and the number of times of the compression test conducted until each high pressure hose is ruptured is recorded. The number of times of the pressure test for each high pressure hose is set forth in Tables 1 and 2.

TABLE 1

| | | Example 1 | Example 2 | Example 3 | Example 4 | Example 5 |
|---|---|---|---|---|---|---|
| Direction of Twisting Steel Cord | First Reinforced Layer 11a | Z | Z | Z | S | Z |
| | Second Reinforced Layer 11b | Z | Z | Z | Z | Z |
| | Third Reinforced Layer 11c | Z | S | S | S | S |
| | Fourth Reinforced Layer 11d | Z | S | Z | Z | S |
| Intermediate Rubber Layer (mm) | Intermediate Rubber Layer 12a | 0.15 | 0.15 | 0.15 | 0.15 | 0.15 |
| | Intermediate Rubber Layer 12b | 0.15 | 0.15 | 0.15 | 0.15 | 0.15 |
| | Intermediate Rubber Layer 12c | 0.15 | 0.15 | 0.15 | 0.15 | 0.30 |
| Shock Durability (100000 Times) | | 9 | 9 | ≥20 | 15 | 15 |

TABLE 2

| | | Comparative Example 1 | Comparative Example 2 | Comparative Example 3 | Comparative Example 4 |
|---|---|---|---|---|---|
| Direction of Twisting Steel Cord | First Reinforced Layer 11a | S | S | S | S |
| | Second Reinforced Layer 11b | S | S | S | S |
| | Third Reinforced Layer 11c | S | Z | Z | S |

TABLE 2-continued

| | | Comparative Example 1 | Comparative Example 2 | Comparative Example 3 | Comparative Example 4 |
|---|---|---|---|---|---|
| | Fourth Reinforced Layer 11d | S | Z | S | Z |
| Intermediate Rubber Layer (mm) | Intermediate Rubber Layer 12a | 0.15 | 0.15 | 0.15 | 0.15 |
| | Intermediate Rubber Layer 12b | 0.15 | 0.15 | 0.15 | 0.15 |
| | Intermediate Rubber Layer 12c | 0.15 | 0.15 | 0.15 | 0.15 |
| Shock Durability (100000 Times) | | 7 | 7 | 6 | 8 |

Tables 1 and 2 reveal that the high pressure hose of the present invention is excellent in shock durability.

DESCRIPTION OF SYMBOLS

10 High pressure hose
11 Steel cord reinforced layer (reinforced layer)
12 Intermediate rubber layer
13 Inner rubber layer
14 Outer rubber layer
20, 120 Steel cord

The invention claimed is:

1. A high pressure hose comprising a plurality of steel cord reinforced layers, the steel cord reinforced layers comprising spirally wound steel cord, the spirally wound steel cord comprising a plurality of twisted steel filaments,
wherein the spirally wound steel cords have a direction of winding and the twisted steel filaments have a direction of twisting whereby
a first condition is a condition in which
a direction of winding a steel cord in an $N^{th}$ (N≥1) steel cord reinforced layer and a direction of winding a steel cord in an $(N+1)^{th}$ steel cord reinforced layer are different from each other, and
a direction of winding a steel cord in a first steel cord reinforced layer and a direction of twisting an outermost layer steel filament in the steel cord in the first steel cord reinforced layer are different, and
a second condition is a condition in which the direction of twisting the outermost layer steel filament in the steel cord in the first steel cord reinforced layer and a direction of twisting an outermost layer steel filament in a steel cord in a second steel cord reinforced layer are identical, and
wherein the high pressure hose either: (1) satisfies the first condition and does not satisfy the second condition; (2) does not satisfy the first condition and does satisfy the second condition; or (3) satisfies the first condition and the second condition, however not simultaneously.

2. The high pressure hose according to claim 1, wherein
a third condition is a condition in which a direction of winding a steel cord in an $L^{th}$ (L≥2) steel cord reinforced layer and a direction of twisting an outermost layer steel filament in the steel cord in the $L^{th}$ steel cord reinforced layer are different, and
a fourth condition is a condition in which the direction of twisting the outermost layer steel filament in the steel cord in the $L^{th}$ steel cord reinforced layer and a direction of twisting an outermost layer steel filament in a steel cord in an $(L+1)^{th}$ steel cord reinforced layer are identical, and
wherein the high pressure hose satisfies the third condition and the fourth condition, however, not simultaneously.

3. The high pressure hose according to claim 2, wherein a fifth condition is satisfied in which the direction of twisting the outermost layer steel filament in the steel cord in the first steel cord reinforced layer and the direction of twisting the outermost layer steel filament in the steel cord in the second steel cord reinforced layer are identical.

4. The high pressure hose according to claim 1, wherein
a third condition is a condition in which the direction of winding the steel cord in the $L^{th}$ (L≥2) steel cord reinforced layer and the direction of twisting the outermost layer steel filament in the steel cord in the $L^{th}$ steel cord reinforced layer are different,
a fourth condition is a condition in which the direction of twisting the outermost layer steel filament in the steel cord in the $L^{th}$ steel cord reinforced layer and the direction of twisting the outermost layer steel filament in the steel cord in the $(L+1)^{th}$ steel cord reinforced layer are identical,
a third' condition is a condition in which a direction of winding a steel cord in an $M^{th}$ (M≥1, and L and M are different) steel cord reinforced layer and a direction of twisting an outermost layer steel filament in the steel cord in the $M^{th}$ steel cord reinforced layer are different,
a fourth' condition is a condition in which the direction of twisting the outermost layer steel filament in the steel cord in the $M^{th}$ steel cord reinforced layer and a direction of twisting an outermost layer steel filament in a steel cord in an $(M+1)^{th}$ steel cord reinforced layer are identical, and
wherein G1 is a gap between the steel cord in the $L^{th}$ steel cord reinforced layer and the steel cord in the $(L+1)^{th}$ steel cord reinforced layer in a case in which the third condition and the fourth condition are simultaneously satisfied, and
G2 is a gap between the steel cord in the $M^{th}$ steel cord reinforced layer and the steel cord in the $(M+1)^{th}$ steel cord reinforced layer in a case in which the third' condition and the fourth' condition are satisfied, however, not simultaneously, whereby
G1>G2 is satisfied.

* * * * *